(12) United States Patent
Ludewig et al.

(10) Patent No.: US 6,362,456 B1
(45) Date of Patent: Mar. 26, 2002

(54) METHOD AND SYSTEM FOR CONTROLLING WELD GEOMETRY FEATURES FOR IMPROVED FATIGUE PERFORMANCE OF FABRICATED STRUCTURES

(75) Inventors: Howard W. Ludewig, Groveland; Ilhan J. Varol, Peoria, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/464,116

(22) Filed: Dec. 16, 1999

Related U.S. Application Data

(60) Provisional application No. 60/112,573, filed on Dec. 17, 1998.

(51) Int. Cl.[7] ............................................. B23K 9/12
(52) U.S. Cl. ............................................... 219/124.34
(58) Field of Search .................. 219/124.34, 130.01, 219/130.21, 137.71, 125.1, 125.11; 901/42

(56) References Cited

U.S. PATENT DOCUMENTS

| | | | |
|---|---|---|---|
| 3,612,818 A | * 10/1971 | Bechtle et al. | 219/137.71 |
| 3,855,446 A | * 12/1974 | Kotova et al. | 219/124.34 |
| 4,144,992 A | * 3/1979 | Omae et al. | 219/125.11 |
| 4,491,718 A | 1/1985 | Cook et al. | |
| 4,724,302 A | 2/1988 | Penney et al. | |
| 4,920,249 A | * 4/1990 | McLaughlin et al. | 219/124.34 |
| 5,302,799 A | 4/1994 | Kennedy et al. | |
| 5,371,339 A | * 12/1994 | Dillet et al. | 219/124.34 |

FOREIGN PATENT DOCUMENTS

EP 0532257 3/1993

OTHER PUBLICATIONS

Agapakis J E: Approaches for Recognition and Interpretation of Workpiece Surface Features Using Structured Lighting Dec. 1990.

* cited by examiner

*Primary Examiner*—Clifford C. Shaw
(74) *Attorney, Agent, or Firm*—Howard & Howard

(57) ABSTRACT

Surfaces of a weld seam are measured to determine weld seam characteristics such as weld seam profile, seam shape, misfit in a seam, seam gap, and surface irregularities. A desired weld bead profile is predicted based on the weld seam profile. Optimal welding parameters for the weld process are determined to achieve the desired weld bead profile. As the weld bead is applied along the weld seam, weld bead characteristics are measured to define the actual weld bead profile. The desired weld bead profile is compared to the actual weld bead profile and the weld process is modified if there is a difference between the actual weld bead profile and the desired weld bead profile. Modifications may include changing wire speed, travel speed, torch position, torch angles, or other various welding parameters.

25 Claims, 1 Drawing Sheet

METHOD AND SYSTEM FOR CONTROLLING WELD GEOMETRY FEATURES FOR IMPROVED FATIGUE PERFORMANCE OF FABRICATED STRUCTURES

This application claims the benefit of prior provisional patent application Ser. No. 60/112,573 filed Dec. 17, 1998.

TECHNICAL FIELD

The present invention relates generally to methods for modifying weld control parameters in an automated welding process based on measurements of a weld bead features and measurements of a weld seam taken before the weld bead is applied.

BACKGROUND ART

A welding process is used to join one metal work piece to a second metal work piece by bringing abutting surfaces from the two work pieces into a molten state. A welded joint is subjected to high stresses resulting from high application loads and residual stresses that pre-exist in the joint due to localized heating and cooling cycles that occur during the welding process. The quality of a welded joint directly relates to the fatigue resistance of the joint as it experiences these high stresses.

Typically, a weld bead is applied along the abutting surfaces of the work pieces during the welding process. The abutting surfaces form a weld seam or weld joint between the work pieces. This weld bead is received within the seam and extends along the length of seam as directed by a controller used in an automated welding process. If the geometry of the weld bead is poor, the life of the welded joint will be short. For example, if the weld includes a sharp notch between the weld bead and the work piece, the joint will usually have a short fatigue life. When using an automated welding process it is important to monitor characteristics of the weld bead to ensure that the weld bead is within a predetermined range of parameters. One important weld bead characteristic to monitor is the weld toe radius, which is formed at the interface between the weld bead and the work piece. If a certain weld bead characteristic is not within an acceptable parameter range, corrections need to be made to the welding process to ensure the quality of the weld bead. It is also important to monitor characteristics of the weld seam to anticipate any seam irregularities that could possibly affect the quality of the weld bead. If seam irregularities are detected, corrections can be made to the welding process to improve the quality of the weld bead as it is applied. Thus, it is important to have a method for modifying welding control parameters in an automated welding apparatus by monitoring the weld seam and the weld bead to continuously provide the highest quality weld bead and for ensuring high fatigue resistance.

The present invention is directed to a system for controlling the quality of a weld during a weld process comprising of a first work piece and a second work piece supported relative to said first work piece to define a weld seam therebetween. In addition, there is a first sensor for measuring weld seam characteristics to produce a weld seam signal representing a weld seam profile and an automated welding apparatus for applying a weld bead along said weld seam to join said first work piece to said second work piece and a second sensor for measuring weld bead characteristics to produce a weld bead signal representing an actual weld bead profile and a controller for comparing said weld seam signal to said weld bead signal and modifying the weld process if there is a difference between the weld seam signal and the weld bead signal.

DISCLOSURE OF THE INVENTION

In one aspect of this invention, a method for controlling the quality of a weld during a weld process where the weld process includes an automated welding apparatus for applying a weld bead along a weld seam to join a first work piece to a second work piece, includes the steps of: measuring weld seam characteristics to obtain a first set of data; determining a weld seam profile based on the first set of data; predicting a desired weld bead profile based on the weld seam profile; determining optimal welding parameters for the weld process to achieve the desired weld bead profile; applying the weld bead along the weld seam; measuring weld bead characteristics to obtain a second set of data for defining an actual weld bead profile; comparing the desired weld bead profile to the actual weld bead profile; and modifying the weld process if there is a difference between the actual weld bead profile and the desired weld bead profile.

In another aspect of this invention, a method for controlling the quality of a weld during a weld process where the weld process includes an automated welding apparatus with a feed-forward controller and a feedback controller for applying a weld bead along a weld joint, includes the steps of: measuring weld joint characteristics to obtain a first set of data; determining a weld joint profile based on the first set of data; predicting optimal welding parameters for the weld process to achieve an optimal weld bead profile based on the weld joint profile; generating a feed-forward prediction signal representing the optimal welding parameters; applying the weld bead along the weld joint; measuring weld bead characteristics to obtain a second set of data for defining an actual weld bead profile; generating a feedback measurement signal representing the actual weld bead profile; comparing the feedback measurement signal to the feed-forward prediction signal; and modifying the weld process in real time if there is a difference between the feed-forward prediction signal and the feedback measurement signal.

In still another aspect of this invention, a system for controlling the quality of a weld during a weld process includes a first work piece and a second work piece supported relative to said first work piece to define a weld seam therebetween. In addition, there is a first sensor for measuring weld seam characteristics to produce a weld seam signal representing a weld seam profile and an automated welding apparatus for applying a weld bead along said weld seam to join said first work piece to said second work piece and a second sensor for measuring weld bead characteristics to produce a weld bead signal representing an actual weld bead profile. In addition, there is a controller for comparing said weld seam signal to said weld bead signal and modifying the weld process if there is a difference between the weld seam signal and the weld bead signal.

BRIEF DESCRIPTION OF THE DRAWINGS

For a better understanding of the present invention, reference may be made to the accompanying drawings in which.

BEST MODE FOR CARRYING OUT THE INVENTION

Figure 1:
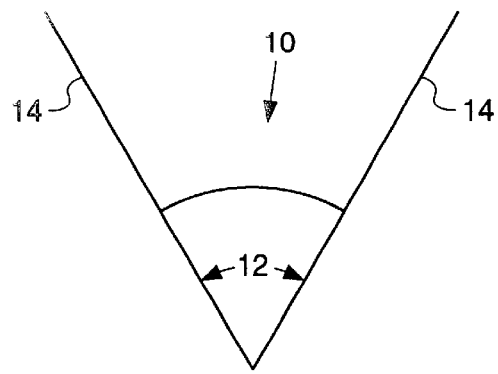
FIG. 1 is a profile of a weld bead on a work surface.

Referring now to the drawings, wherein like numerals indicate like or corresponding parts throughout the several views, a weld bead 10 is generally shown in FIG. 1. The weld bead 10 is laid along a weld seam or joint 12 that exists between abutting surfaces 14 of work pieces that are to be joined together. The weld seam 12 is defined as an area that exists between work pieces where the weld bead 10 is to be laid. The weld seam 12 has several geometric characteristics including seam gap and seam surface profiles. The seam gap is defined as the distance between two edges of work pieces along the seam. The seam gap can vary, i.e. narrow or widen, along the length of the seam 12. The seam surface profile is defined as the surfaces along the edges of the work pieces and includes any surface irregularities that might affect the weld bead 10 as it is applied during the welding process.

Figure 2:
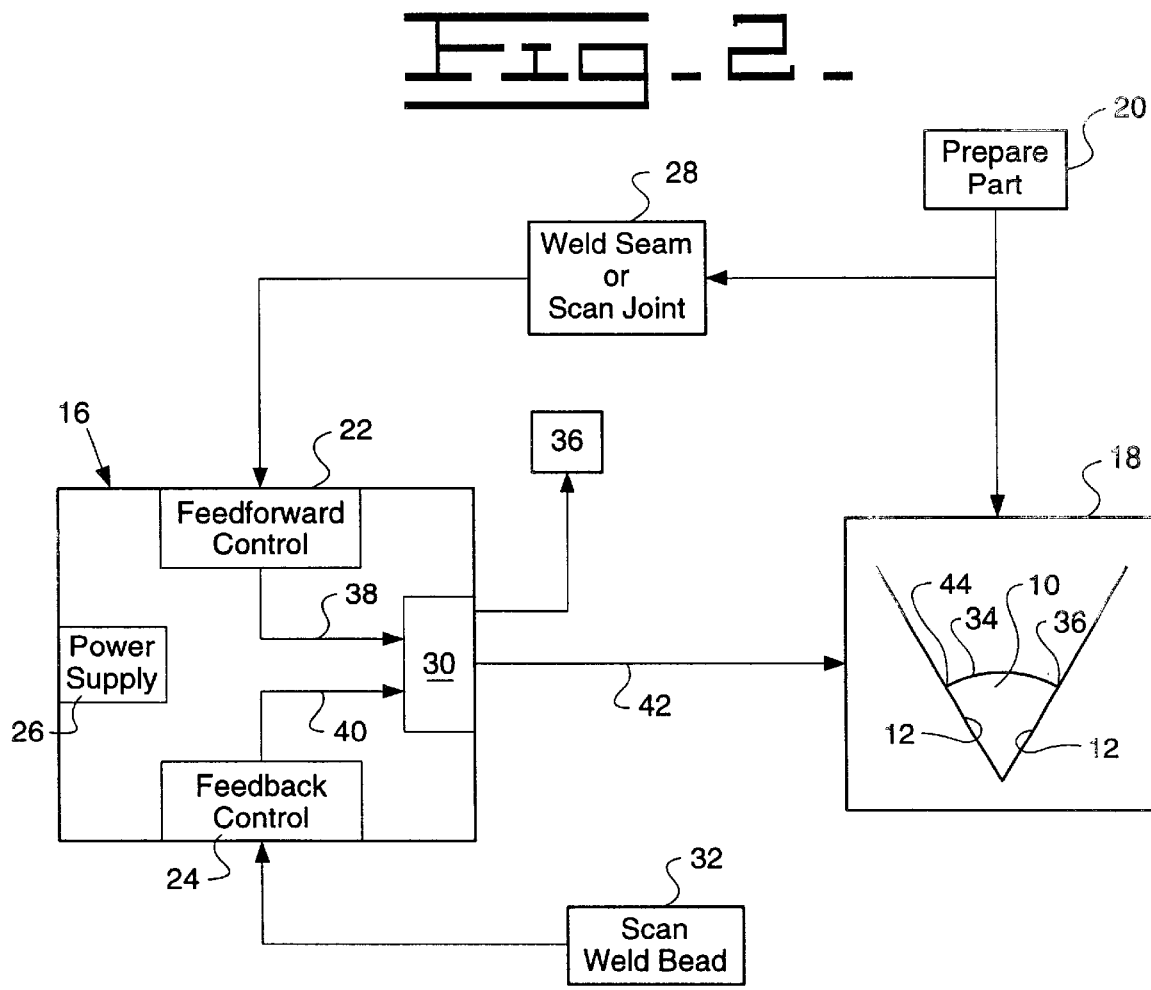
FIG. 2 is a schematic diagram of the subject automated welding process control system is a block diagram of an electronic control system.

The automated welding process and system that is used to control the quality of a weld bead 10 is shown schematically in FIG. 2. An automated welding apparatus 16 is used to apply the weld bead 10 along the weld seam 12 between work pieces 18. Preferably the welding apparatus is a robotic welding device powered by a power supply 26, however, other automated welding devices known in the art could also be used. Before the weld bead 10 is applied, the work piece 18 must be prepared for the welding process and attached to a fixture or other holding device. This step is shown schematically at 20 in FIG. 2.

The welding apparatus 16 includes a feed-forward controller 22 and a feedback controller 24. The feed-forward controller 22 is used to analyze weld seam 12 characteristics while the feedback controller 24 is used to analyze weld bead 10 characteristics. Together, the feed-forward 22 and feedback 24 controllers are used to determine the optimal welding process parameters that are used by the welding apparatus 16 to apply the weld bead 10 to the weld seam 12. These parameters include for example, wire speed, travel speed, power supply, torch position, torch angle, and other various parameters known in the art. The feed-forward 22 and feed back 24 controllers are preferably computer processing units, however, other computational devices known in the art could be used.

The method for controlling the quality of a weld during a weld process includes measuring weld seam characteristics 28 to obtain a first set of data to be processed by the feed-forward controller 22. The weld seam characteristics that are measured include seam gap, the angle between seam surfaces and seam contours. The step of measuring weld seam characteristics can be accomplished by any of various methods. For example, the surface of weld seam 12 can be scanned with a vision sensor before initiating the welding process to obtain the first set of data. The vision sensor used in this process can be any of various vision sensors known in the art, but the vision sensor is preferably a laser vision camera.

Optionally, a plurality of points can be measured along the weld seam 12 with a tactile sensor before initiating the welding process to obtain a plurality of spatial coordinates for creating the first set of data. The tactile sensor can be mounted to a robotic arm, which moves along a predetermined path to touch various points along the weld seam 12.

Note that both of these options scan the weld seam 12 prior to initiation of the welding process. The welding process parameters are then determined based on this pre-weld scan. With these two methods, once the welding process has started, new data cannot be sent to the feed-forward controller 24 to update the welding parameters in real time.

A third method allows the weld seam 12 to be scanned real time during the welding process to provide real time data to the feed-forward controller 22. The feed-forward controller 22 can use this continuous input of weld seam data to update the welding parameters real time. This third method involves measuring weld seam characteristics by scanning surfaces of the weld seam 12 with a vision sensor during the welding process to obtain the first set of data. Thus, the weld seam 12 is scanned just prior to receiving the weld bead 10.

The first set of data, i.e. the weld seam data, is created based on measurements of the seam shape and seam gap. Basically, the first set of data includes information that is used to map the entire surface of the weld seam including any surface irregularities that might affect the weld bead 10 when it is applied.

The first set of data is received and stored in the feed-forward controller 22. The feed-forward controller 22 uses the first set of data to determine a weld seam profile, i.e. a map of the surface of the weld seam 12. Based on the measured weld seam characteristics, a main controller 30 predicts optimal welding parameters to achieve a desired weld bead profile. The main controller, the feed-forward controller 22, and the feedback controller 24 can be included within one computational device such as a standard computer, however, the controllers 22, 24, 30 are shown separately in FIG. 2 for description purposes. Once the optimal welding parameters for the weld process have been determined, the welding apparatus 16 applies the weld bead 10 along the weld seam 12.

The weld bead characteristics are then measured 32 to obtain a second set of data for defining an actual weld bead profile 34. The second set of data is processed by the feedback controller 24 which works in conjunction with the feed-forward controller 22 to modify the weld process parameters to achieve a high quality, optimal weld bead 10 for the existing weld seam 12. The weld bead can be scanned with a vision sensor, such as a laser vision camera in real time to provide immediate feedback on weld bead shape. Thus, predictions of the desired weld bead profile and the weld process parameters can be modified in real time based on the first and second sets of data being continuously collected as the weld bead 10 is applied along the weld seam 12. Optionally, the weld process parameters can be modified in real time based on the continuously updated second set of data and the initial measured weld seam characteristics in the first set of data.

The desired weld bead profile is then compared to the actual weld bead profile 34 and the weld process is modified if there is a difference between the actual weld bead profile 34 and the desired weld bead profile. Weld process parameters such as travel speed and weld torch position, for example, can be modified to improve the quality of the weld bead 10. An error signal 36 can be generated if there is a difference between the actual weld bead profile and the desired weld bead profile to initiate the process for modifying the welding parameters.

The main controller 30 can use a neural network analysis process to analyze the first and second sets of data to determine optimal welding parameters. The neural network analysis process uses a neural network that has been trained from empirical data to predict the welding procedure that is required to optimize the welding process to give the best surface profile, side wall fusion, and root penetration for the weld bead 10.

The main controller 30 can also use statistical populated and analyzed data for determining optimal welding process parameters. This statistical analysis is an empirical determination of optimal welding process parameters based on the correlation between input process parameters and measured weld bead profile 34 descriptors such as weld toe radius as well as others.

Both methods rely on empirical data to build models as bases for predictions of welding parameters. Empirical data is data that originates or is based on observation, experience or experiment. Thus, the data collected from the scans of the weld seam 12 and the weld bead 10 is used to build the empirical models which are then used to determine the optimal welding parameters to achieve the best weld bead profile.

An important weld bead characteristic that can easily be used to determine quality of a weld bead 10 is the weld toe 44. The weld toe 44 has a weld toe radius, which is formed at the interface between the weld bead and the work piece. The weld toe radius can be determined by using the second set of data. The measured weld toe radius can then be compared to a desired weld toe radius determined from the desired weld bead profile. The weld process can be modified if there is a difference between the desired weld toe radius and the weld toe radius derived from the second set of data.

In one embodiment, a feed-forward prediction signal 38 is generated representing the optimal welding parameters for the weld process to achieve the desired weld bead profile. A feedback measurement signal 40 is generated representing the measured weld bead characteristics used to define an actual weld bead profile. These signals 38, 40 are received by the main controller 30 which compares the signals 38, 40 and modifies the weld process if there is a difference between the feed-forward prediction signal 38 and the feedback measurement signal 40. The main controller 30 then sends out a control signal 42 representing the modified welding process parameters, which are used to control the welding apparatus 16 as it applies the weld bead 10.

Using a feed-forward controller 22 for analyzing weld seam characteristics and a feedback controller 24 for analyzing weld bead characteristics to control and modify welding process parameters greatly improves the quality of the weld bead 10. Also, being able to use the feed-forward 22 and feedback 24 controllers to modify welding process parameters in real time greatly improves overall welding process efficiency. Parts that have been welded by using this method have improved fatigue resistance and are less likely to include weld bead flaws, such as sharp notches, which significantly decrease the fatigue life of a part.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

INDUSTRIAL APPLICABILITY

The present invention relates generally to methods for modifying weld control parameters in an automated welding process based on measurements of the a weld bead and measurements of a weld joint taken before the weld bead is applied. A controller is used to varying the weld process parameters if the weld bead profile is determined to be different than desired weld bead profile.

Other aspects, objects and advantages of the present invention can be obtained from a study of the drawings, the disclosure and the appended claims.

What is claimed is:

1. A method for controlling the quality of a weld during a weld process, the weld process including an automated welding apparatus for applying a weld bead along a weld seam to join a first work piece to a second work piece, the method comprising the steps of:

measuring weld seam characteristics to obtain a first set of data;

determining a weld seam profile based on the first set of data;

predicting a desired weld bead profile based on the weld seam profile;

determining optimal welding parameters for the weld process to achieve the desired weld bead profile;

applying the weld bead along the weld seam;

measuring weld bead characteristics to obtain a second set of data for defining an actual weld bead profile;

comparing the desired weld bead profile to the actual weld bead profile; and modifying the weld process if there is a difference between the actual weld bead profile and the desired weld bead profile.

2. A method as set forth in claim 1, including the step of generating an error signal if there is a difference between the actual weld bead profile and the desired weld bead profile.

3. A method as set forth in claim 1, wherein the step of measuring weld seam characteristics includes measuring seam contours for determining a seam shape.

4. A method as set forth in claim 3, wherein the step of measuring weld seam characteristics includes measuring a distance between abutting surfaces of the weld seam for determining a seam gap.

5. A method as set forth in claim 4, including the step of creating the first set of data based on measurements of the seam shape, seam gap and seam angle.

6. A method as set forth in claim 1, wherein the step of measuring weld seam characteristics includes the step of scanning surfaces of the weld seam with a vision sensor before initiating the welding process to obtain the first set of data.

7. A method as set forth in claim 1, wherein the step of measuring weld seam characteristics includes the step of measuring a plurality of points along the weld seam with a tactile sensor before initiating the welding process to obtain a plurality of spatial coordinates for creating the first set of data.

8. A method as set forth in claim 1, wherein the step of measuring weld seam characteristics includes the steps of scanning surfaces of the weld seam with a vision sensor during the welding process to obtain the first set of data.

9. A method as set forth in claim 8, further including the steps of modifying predictions for the desired weld bead profile in real time based on the first set of data being continuously collected as the weld bead is applied along the weld seam.

10. A method as set forth in claim 1, including the step of using a neural network analysis process for determining optimal welding parameters.

11. A method as set forth in claim 1, including the step of using a statistical analysis process for determining optimal welding parameters.

12. A method as set forth in claim 1, wherein the step of measuring weld bead characteristics includes the steps of scanning surfaces of the weld bead in real time with a vision sensor during the welding process to obtain the second set of data.

13. A method as set forth in claim 12, further including the steps of determining a weld toe radius based on the second set of data, comparing the weld toe radius to a desired weld toe radius derived from the desired weld bead profile, and modifying the weld process if there is a difference between the desired weld toe radius and the weld toe radius derived from the second set of data.

14. A method as set forth in claim 1, wherein the automated welding apparatus includes a feed-forward controller and a feedback controller, and the method further includes the steps of generating a feed-forward prediction signal representing the optimal welding parameters for the weld process to achieve the desired weld bead profile, generating a feedback measurement signal representing measured weld bead characteristics used to define an actual weld bead profile, comparing the feedback measurement signal to the feed-forward prediction signal, and modifying the weld process in real time if there is a difference between the feed-forward prediction signal and the feedback measurement signal.

15. A method as set forth in claim 14, wherein modifying the weld process further includes the steps of modifying travel speed of a welding torch along the work pieces.

16. A method as set forth in claim 14, wherein modifying the weld process further includes the steps of modifying weld torch position in relation to the work pieces.

17. A method for controlling the quality of a weld during a weld process, the weld process including an automated welding apparatus with a feed-forward controller and a feedback controller for applying a weld bead along a weld joint, the method comprising the steps of:
measuring weld joint characteristics to obtain a first set of data;
determining a weld joint profile based on the first set of data;
predicting optimal welding parameters for the weld process to achieve an optimal weld bead profile based on the weld joint profile;
generating a feed-forward prediction signal representing the optimal welding parameters;
applying the weld bead along the weld joint;
measuring weld bead characteristics to obtain a second set of data for defining an actual weld bead profile;
generating a feedback measurement signal representing the actual weld bead profile;
comparing the feedback measurement signal to the feed-forward prediction signal; and
modifying the weld process in real time if there is a difference between the feed-forward prediction signal and the feedback measurement signal.

18. A method as set forth in claim 17, further including the step of modifying weld process speed parameters when there is a difference between the feed-forward prediction signal and the feedback measurement signal.

19. A method as set forth in claim 17, further including the step of modifying weld process power supply parameters when there is a difference between the feed-forward prediction signal and the feedback measurement signal.

20. A method as set forth in claim 17, further including the step of modifying a weld torch angle and weld torch position formed between a weld torch and the weld joint when there is a difference between the feed-forward prediction signal and the feedback measurement signal.

21. A system for controlling the quality of a weld between a first work piece and a second work piece supported relative to the first work piece to define a weld seam therebetween, comprising:
a first sensor for measuring weld seam characteristics to produce a weld seam signal representing a weld seam profile;
an automated welding apparatus for applying a weld bead along said weld seam to join said first work piece to said second work piece;
a second sensor for measuring weld bead characteristics to produce a weld bead signal representing an actual weld bead profile; and
a controller for predicting a desired weld bead profile based on said weld seam signal, comparing said desired profile to said actual profile represented by said weld bead signal and modifying weld parameters for said welding apparatus based upon a difference between the desired and the actual weld bead profile.

22. A system as set forth in claim 21, including an indicator for indicating when there is a difference between said weld seam signal and said weld bead signal.

23. A system as set forth in claim 21, wherein said first sensor is a laser vision camera for scanning said weld seam to obtain said weld seam profile.

24. A system as set forth in claim 21, wherein said first sensor is a tactile sensor for touching a plurality of weld seam points to obtain said weld seam profile.

25. A system as set forth in claim 21, wherein said second sensor is a laser vision camera for scanning said weld bead to obtain said actual weld bead profile.

* * * * *